United States Patent [19]

Cason, Jr.

[11] Patent Number: 4,777,072

[45] Date of Patent: Oct. 11, 1988

[54] PLIABLE SHEET AND COUPLING STRIP

[76] Inventor: Claude Cason, Jr., 941 Broadmoor Ter., Richmond, Ind. 47374

[21] Appl. No.: 17,940

[22] Filed: Feb. 24, 1987

[51] Int. Cl.⁴ .......................... B32B 1/04; B32B 3/26
[52] U.S. Cl. ..................................... 428/120; 428/61;
    428/543; 24/573; 24/587; 24/615; 24/616;
    24/630; 174/DIG. 8; 138/128; 138/158
[58] Field of Search ......................... 428/61, 120, 543;
    138/128, 156, 158, 168; 24/587, 573, 615, 616,
    630; 174/DIG. 8

[56] References Cited

U.S. PATENT DOCUMENTS

| | | | |
|---|---|---|---|
| 1,399,088 | 12/1921 | Seymour . | |
| 3,151,767 | 10/1964 | Nakata . | |
| 3,818,669 | 6/1974 | Moss . | |
| 3,875,623 | 4/1975 | Johnston | 24/573 |
| 4,084,066 | 4/1978 | Gillemot | 138/158 X |
| 4,379,473 | 4/1983 | Kunze | 138/128 |

Primary Examiner—Alexander S. Thomas
Attorney, Agent, or Firm—Barnes & Thornburg

[57] ABSTRACT

A sleeve assembly including a pliable sheet and a coupling strip is provided. The coupling strip is adapted to interconnect the ends of the pliable sheet to form a cylindrically-shaped unit. The ends of the pliable sheet are formed to include flukes that are configured to engage the coupling strip. The coupling strip includes a rigid base member and a spaced-apart, substantially parallel seesaw member. The seesaw member is joined to the base member by a pivot beam. The seesaw member has a first leg and a second leg, with the first and second legs cooperating with the base member to form first and second nests for receiving the flukes of the pliable sheet. The seesaw member is permitted to pivot somewhat with respect to the base member to equalize the capturing forces of the first and second nests to enhance the strength and rigidity of the assembled sleeve assembly.

4 Claims, 1 Drawing Sheet

PLIABLE SHEET AND COUPLING STRIP

BACKGROUND AND SUMMARY OF THE INVENTION

The present invention relates to a novel plastic sheet and coupling strip that cooperate to form a cylindrical sleeve. More particularly, the present invention relates to a pliable sheet having uniquely designed ends that may be joined by a coupling strip to form a sleeve that has an accurate cylindrical shape. The cylindrically-shaped sleeve, because of its true cylindrical shape, is adapted for use in several different applications, and specifically for use as a grass catcher chute on a lawn mower equipped with a grass catcher.

Conventional sleeves for use where a cylindrically-shaped conduit is required are normally formed in one piece. The sleeve is generally formed from a pliable sheet, with the ends of the sleeve permanently joined to form the cylindrically-shaped sleeve. Alternatively, the cylindrically-shaped sleeve can be extruded using an extrudable resin to produce a smooth, continuous cylindrically-shaped sleeve that has no connections or other points that could produce a weak area in the sleeve. Such methods are conventional, and are well known to those skilled in the art.

One problem with that type of conventional sleeve is that, when the sleeves are to be incorporated into another piece of equipment, the sleeves must be shipped from the point of production to the manufacturer. Because the sleeves are already formed into cylindrically-shaped units, it is necessary to ship the sleeves in this assembled configuration. Shipping of the cylindrically-shaped sleeves results in a great deal of space being required to ship a relatively small number of sleeves. These conventional sleeves cannot be flattened for shipping because most of the extrudable resins used would be subject to creasing and deformation if the sleeves were flattened.

One object of the present invention is to provide a pliable sheet that can be shipped flat, and that can be assembled into a cylindrically-shaped sleeve after the shipping process has been completed.

Another object of the present invention is to provide a coupling strip that is adapted to join the two ends of the pliable sheet to form a true cylindrically-shaped sleeve.

Another object of the present invention is to provide a pliable sheet and coupling strip that permits the formation of a sleeve that has a true cylindrical shape, and that is not subject to any weaknesses at the point where the ends of the plastic sheet are coupled together.

Yet another object of the present invention is to provide a coupling strip that is adapted to join the two ends of the pliable sheet to form a cylindrically-shaped sleeve such that the sleeve has a structural strength permitting it to be used in a wide variety of applications, with the coupling strip being easily detachable from the ends of the sheet should disassembly of the sleeve be necessary.

According to the present invention, a sleeve assembly is provided that includes a pliable sheet having opposite ends. The pliable sheet includes a first fluke formed at one of the ends, and a second fluke formed at the other of the ends. A coupling strip is provided for interconnecting the first and second flukes, with the coupling strip having a rigid base formed to include two ends. A pivot beam is integrally fixed to the base. A seesaw member is provided that is integrally fixed to the pivot beam, with the seesaw member having a first leg extending in a first direction from the pivot beam toward one of the ends of the base, and a second leg extending in a second direction from the pivot beam toward the other one of the ends of the base. The first leg of the seesaw member and one of the ends of the base cooperate to provide a first nest for receiving the first fluke, and the other end of the base and the second leg of the seesaw member cooperate to provide a second nest for receiving the second fluke to form the sleeve assembly.

One feature of the foregoing structure is that the sleeve assembly comprises a pliable sheet and a separate coupling strip for interconnecting the ends of the sheet to form the sleeve assembly. One advantage of this feature is that the pliable sheet can be shipped flat, and then formed into a cylindrically-shaped sleeve at the destination. This permits a large number of unassembled sleeve units to be shipped in a relatively small space.

Another feature of the foregoing structure is that each end of the pliable sheet includes a fluke and the coupling strip includes first and second nests for receiving these flukes. Because of the orientation of the nests, the ends of the pliable sheet are depressed somewhat and placed in tension when engaged by the coupling strip. One advantage of this feature is that the coupling strip is configured to capture each end of the pliable sheet in a rigid, but selectively detachable orientation to form the sleeve assembly. Another advantage of this feature is that the assembled sleeve assumes a true cylindrical shape without any outward protrusions.

Another feature of the foregoing structure is that the seesaw member is pivotally attached to the base member of the coupling strip by a pivot beam. One advantage of this feature is that the seesaw member, which cooperates with the base member to form the nests, is somewhat movable with respect to the base member in such a manner that the flukes are snugly and positively captured in each nest.

In preferred embodiments of the present invention, the seesaw member is formed to include an elongated V-shaped groove having an opening presented away from the pivot beam. The elongated groove is situated along the length of the seesaw member in spaced-apart, substantially parallel alignment with the elongated pivot beam.

One feature of the foregoing structure is that the V-shaped groove permits a limited degree of flexure between the first and second legs of the seesaw members. One advantage of this feature is that the seesaw member, in addition to having limited pivotal movement with respect to the base member, also has limited pivotal movement between the first and second legs. This feature permits more secure and stable engagement with the flukes on the ends of the plastic sheet to form a more rigid cylindrically-shaped sleeve assembly.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
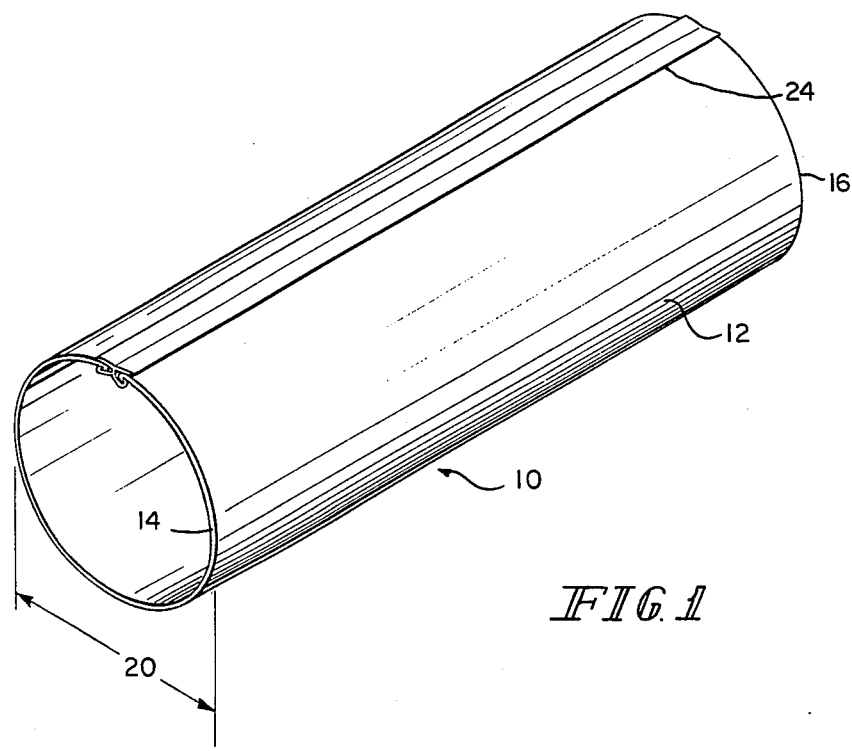
FIG. 1 is a perspective view of the assembled sleeve.

Referring now to FIG. 1, FIG. 1 shows a sleeve assembly 10 according to the present invention. The assembly 10 is formed from a pliable sheet 12 having a first side edge 14 and a second side edge 16. Illustratively, the pliable sheet 12 is formed from an extrudable resin, preferably a polyethylene material having a high molecular weight. The sleeve assembly has a diameter indicated by the dimension 20. In the preferred embodiment, the diameter of the sleeve assembly 10 is approximately 8.5 inches (21.59 cm.). A coupling strip 24 is provided to couple the pliable sheet 12 together to form the sleeve assembly 10. It will be understood that the pliable sheet 12 is normally stored and shipped in a flat configuration (not shown), with the coupling strip 24 being used to join the ends of the pliable sheet 12 to form the sleeve assembly 10 at the destination or point of use.

Although it will be understood that a cylindrically-shaped assembly such as the sleeve assembly 10 could be used for many purposes, the sleeve assembly 10 shown in FIG. 1 is illustratively used as a grass catcher chute which is used to convey lawn clippings from the mower deck of a lawn mower to a grass catcher or wagon. It will be understood that it is advantageous to be able to ship a pliable sheet 12 in a flat configuration to the manufacturing location for the lawn mower units. At that location, the pliable sheet 12 can then be formed using the coupling strip 24 to form a completed sleeve assembly 10.

Figure 2:
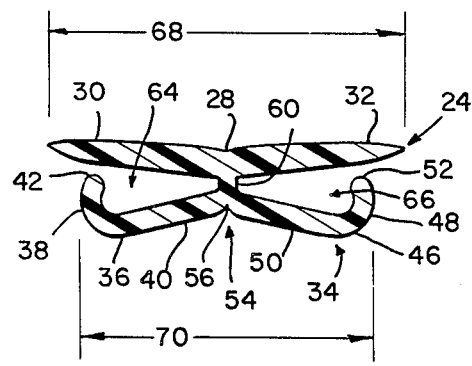
FIG. 2 is a cross-sectional view of the coupling strip illustrated in FIG. 1.

Referring now to FIG. 2, FIG. 2 shows a cross-section of the elongated coupling strip 24 illustrated in FIG. 1. The coupling strip 24 includes an upper base member 28 that is somewhat concave. The base member 28 includes a first rib or leg 30 and a second rib or leg 32. A seesaw member 34 is positioned below the base member 28 in spaced-apart, generally parallel relation. The seesaw member 34 includes a first leg 36 having a curved distal portion 38 and a straight proximal portion 40. The curved distal portion 38 terminates in a tip 42. The seesaw member 34 also includes a second leg 46 having a curved distal portion 48 and a straight proximal portion 50. The curved distal portion 48 terminates in a tip 52. The first leg 36 and second leg 46 are joined together at a merger point 54. A V-shaped groove 56 is formed at the merger point and extends longitudinally along the seesaw member 34.

The seesaw member 34 is joined to the base member 28 by a pivot beam 60. In the preferred embodiment, the width of the pivot beam 60 is less than the thickness of the base member 28. The width of the pivot beam 60 could be equal to the thickness of the base member 28, however, preferably, the width should be no greater than the thickness of the base member 28. The size and configuration of the pivot beam 60 permits limited pivotal movement of the seesaw member 34 with respect to the base member 28. In addition, the provision of a V-shaped groove 56 in the seesaw member 34 permits limited pivotal movement of the individual legs 36, 46 of the seesaw member with respect to each other.

The straight proximal portion 40, and the curved distal portion 38 of the first leg 36 of the seesaw member 34 cooperate with the first leg 30 of the base member 28 to form an interior first nest 64. As illustrated, the first nest 64 is somewhat triangular shaped and extends radially inwardly from the curved distal portion 38 to the pivot beam 60. Likewise, the curved distal portion 48 and the straight proximal portion 50 of the second leg 46 cooperate with the second leg 32 of the base member 28 to form a second nest 66. The second nest 66 has a shape and size that is substantially similar to that of the first nest 64.

As illustrated in FIG. 2, the width of the base member 28 is illustrated by the dimension 68 and is somewhat greater than the width of the seesaw member 34 as illustrated by the dimension 70. Illustratively, in the preferred embodiment, the width of the base member 28 is approximately 1.375 inches (3.49 cm.) and the width of the seesaw member 34 is approximately 1.060 inches (2.69 cm.).

Figure 3:
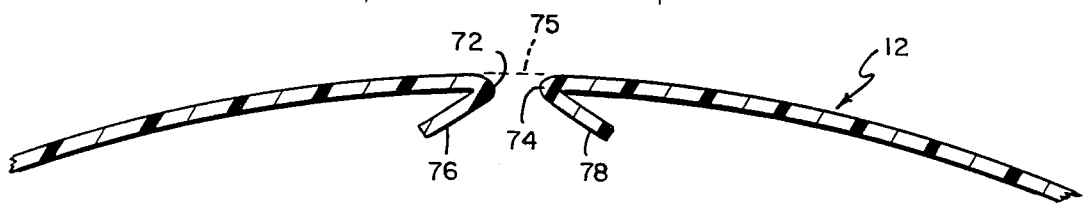
FIG. 3 is a cross-sectional view showing opposite ends of the pliable sheet in position prior to interconnection; and, FIG. 4 is a view similar to FIG. 3 showing further bowing of the pliable sheet that is necessary to insert the flukes into the coupling strip.

Referring now to FIG. 3, FIG. 3 shows the pliable sheet 12 with a first end 72 and a second end 74 being positioned prior to interconnection. The first end 72 has a downwardly turned edge that forms a first fluke 76. Likewise, the second end 74 has a downwardly turned edge that forms a second fluke 78. It will be understood that the flukes 76, 78 provide anchor means on the pliable sheet 12. When the two ends 72, 74 of the pliable sheet 12 are brought together as illustrated in FIG. 3, the outer surface of the pliable sheet will define a circle as indicated by the extended line 75.

Figure 4:
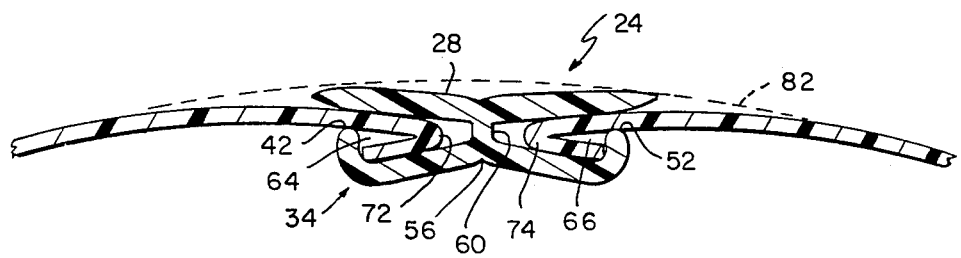

Referring now to FIG. 4, FIG. 4 shows the first end 72 and second end 74, and specifically the first fluke 76 and second fluke 78 captured within the coupling strip 24 to form the completed sleeve assembly 10 as illustrated in FIG. 1. To couple the coupling strip 24 with the first end 72 and second end 74, the coupling strip 24 is slid over the first fluke 76 and second fluke 78 along an axis that is orthogonal to the plane of the figure. Specifically, the coupling strip 24 is joined with the first end 72 and second end 74 such that the first fluke 76 and second fluke 78 are received within the first nest 64 and second nest 66, respectively.

Because of the concave shape of the base member 28, it is necessary to depress the first end 72 and second end 74 toward the center of the circle 75 (FIG. 3). This depression of the first end 72 and second end 74 is illustrated in FIG. 4. The pliable sheet 12 extends from the nest 64, 66 through the opening between the tips 42, 52 and the lower surfaces of the base member 28. Ideally, the size of the spaces between the tips 42, 52, and the lower surfaces of the base member 28 are the same as or slightly smaller than the thickness of the pliable sheet 12. This size configuration permits the pliable sheet 12 to be captured snugly in these spaces. In addition, the nests 64, 66 are preferably sized to capture snugly the flukes 76, 78. This size configuration permits the first end 72 and second end 74 to be securely retained by the coupling strip 24. This coupling orientation adds rigidity to the connection point, and does not create any weak areas in the assembled sleeve assembly 10.

Because the seesaw member 34 is capable of pivoting somewhat with respect to the base member 28, the size of the nests 64, 66 can adjust somewhat with respect to each other. This permits an equalization of the capturing ferces of the nests 64, 66 on the flukes 76, 78, respectively. This equalization of the capturing forces provides for a more secure coupling between the coupling strip 24 and the flukes 76, 78. In addition, the provision of the longitudinal V-shaped groove 56 permits limited flexure of each of the legs 36, 46 of the seesaw member 34 with respect to the base member 28. This limited flexure enhances the equalization of the capturing forces within the nests 64, 66.

The concave configuration of the base member 28, and the consequent depression of the first end 72 and second end 74 to accomplish the engagement with the coupling strip 24, enables the assembled sleeve assembly 10 to maintain a generally smooth outer circumference that is circular in shape. Specifically, as illustrated in FIG. 4, an extended arc 82 of the outer circumference of the sleeve assembly 10 passes directly over the edges of the base member 28. Thus, the assembled sleeve assembly 12 presents a true cylindrically-shaped unit with no protrusions. This greatly enhances the use of the sleeve assembly 10 in applications where a true cylindrical shape is required.

Thus, the pliable sheet and coupling strip of the present invention permits for easy transport and storage. In addition, the unique structural characteristics of the coupling strip provides for an assembled sleeve assembly that presents a structurally sound, uniform cylindrical shape.

Although the invention has been described in detail with reference to a preferred embodiment and specific examples, variations and modifications exist within the scope and spirit of the invention as described and defined in the following claims.

What is claimed is:

1. A coupling strip for releasably interconnecting two ends of a pliable sheet to form a substantially rigid cylindrical sleeve assembly, the sheet including a first fluke at one of the ends and a second fluke at the other of the ends, the coupling strip comprising:

a rigid outer elongated base having a predetermined width, a pivot beam having a proximal portion integrally fixed to the base so that the pivot beam extends along the length of the base and a distal portion projecting away from the base, the pivot beam partitioning the base to provide oppositely extending first and second ribs, an elongated inner seesaw member integrally fixed to the distal portion of the pivot beam for limited pivotal movement thereon toward and away from the base, the seesaw member including first leg means for cooperating with the first rib to provide first nest means for receiving the first fluke and second leg means for cooperating with the second rib to provide second nest means for receiving the second fluke, the first and second leg means both having a straight proximal portion fixed to the pivot beam and a curved distal portion that extends toward the companion rib and having a tip situated in close proximity to the companion rib so that the proximal portion, the distal portion, and the rib cooperate to define a nesting chamber having a substantially triangular cross section, and wherein the seesaw member has a predetermined width extending between outermost portions of the first and second leg means, with the predetermined width of the seesaw member being slightly less than the predetermined width of the base.

2. The coupling strip of claim 1, wherein the seesaw member is formed to include an elongated V-shaped groove having an opening presented away from the pivot beam and the elongated groove is situated along the length of the seesaw member in substantially spaced-apart parallel alignment with the elongated pivot beam.

3. The coupling strip of claim 1, wherein the first leg means is elongated to extend along substantially the entire length of the pivot beam.

4. A coupling strip for releasably interconnecting two ends of a pliable sheet to form a substantially rigid cylindrical sleeve assembly, the sheet including a first fluke at one of the ends and a second fluke at the other of the ends, the coupling strip comprising:

a rigid outer elongated base having a predetermined width, a pivot beam having a proximal portion integrally fixed to the base so that the pivot beam extends along the length of the base and a distal portion projecting away from the base, the pivot beam partitioning the base to provide oppositely extending first and second ribs, an elongated inner seesaw member integrally fixed to the distal portion of the pivot beam for limited pivotal movement thereon toward and away from the base, the seesaw member including first leg means for cooperating with the first rib to provide first nest means for receiving the first fluke and second leg means for cooperating with the second rib to provide second nest means for receiving the second fluke, the first and second leg means both having a straight proximal portion fixed to the pivot beam and a curved distal portion that extends toward the companion rib and having a tip situated in close promitity to the companion rib so that the proximal portion, the distal portion, and the rib cooperate to define a nesting chamber having a substantially triangular cross section, wherein the pivot beam has a predetermined width and the base has a predetermined thickness that is greater than or equal to the predetermined width of the pivot beam.

* * * * *